United States Patent
Xie et al.

(10) Patent No.: US 12,156,110 B2
(45) Date of Patent: Nov. 26, 2024

(54) BLUETOOTH DATA FORWARDING METHOD AND DEVICE

(71) Applicant: SHENZHEN BLUETRUM TECHNOLOGY CO., LTD., Guangdong (CN)

(72) Inventors: Linting Xie, Guangdong (CN); Jingfa Liu, Guangdong (CN)

(73) Assignee: SHENZHEN BLUETRUM TECHNOLOGY CO., LTD., Guangdong (CN)

( * ) Notice: Subject to any disclaimer, the term of this patent is extended or adjusted under 35 U.S.C. 154(b) by 201 days.

(21) Appl. No.: 17/260,234

(22) PCT Filed: Aug. 26, 2020

(86) PCT No.: PCT/CN2020/111334
§ 371 (c)(1),
(2) Date: Jan. 14, 2021

(87) PCT Pub. No.: WO2022/040974
PCT Pub. Date: Mar. 3, 2022

(65) Prior Publication Data
US 2022/0303744 A1    Sep. 22, 2022

(51) Int. Cl.
*H04W 4/80* (2018.01)
*H04W 24/08* (2009.01)
*H04W 76/19* (2018.01)

(52) U.S. Cl.
CPC ............ *H04W 4/80* (2018.02); *H04W 24/08* (2013.01); *H04W 76/19* (2018.02)

(58) Field of Classification Search
CPC ........ H04W 76/19; H04W 24/08; H04W 4/80
See application file for complete search history.

(56) References Cited

U.S. PATENT DOCUMENTS

| | | | | |
|---|---|---|---|---|
| 2014/0162555 A1* | 6/2014 | Wernaers | ................ | H04W 4/80 455/41.2 |
| 2015/0327001 A1* | 11/2015 | Kirshenberg | ........... | H04W 4/80 455/41.2 |

(Continued)

FOREIGN PATENT DOCUMENTS

| | | | | |
|---|---|---|---|---|
| CN | 107018484 A | * | 8/2017 | ............. H04B 7/026 |
| CN | 107135256 A | | 9/2017 | |

(Continued)

OTHER PUBLICATIONS

International Search Report and Written Opinion of the International Searching Authority issued on May 21, 2021 for PCT/CN2020/111334.

(Continued)

*Primary Examiner* — Noel R Beharry
*Assistant Examiner* — Angelie T Ngo
(74) *Attorney, Agent, or Firm* — Yue (Robert) Xu; Apex Attorneys at Law, LLP

(57) ABSTRACT

A communication method for a wireless device, a wireless device and a computer readable storage media are provided to improve data transmission efficiency and reduce power consumption of the device. The communication method for a wireless device includes: serving, by one of the master device and the slave device, as a sender, serving, by the other one of the master device and the slave device, as a receiver, and obtaining, by the receiver, a result of receiving the Bluetooth data by the sender; and forwarding, by a successful receiver that successfully receives first Bluetooth data, the first Bluetooth data in a predetermined downstream slot to a failed receiver via the second Bluetooth link in a case that one of the master device and the slave device fails to receive the first Bluetooth data.

10 Claims, 6 Drawing Sheets

---

201 One of the master device and the slave device serve as a sender, the other one of the master device and the slave device serve as a receiver, and the receiver obtain a result of receiving the Bluetooth data by the sender

↓

202、 In a case that one of the master device and the slave device fails to receive first Bluetooth data, a successful receiver forwards the first Bluetooth data in a predetermined downstream slot to a failed receiver via the second Bluetooth link, where the successful receiver is one of the master device and the slave device that successfully receives the first Bluetooth data, and the failed receiver is the one of the master device and the slave device that fails to receive the first Bluetooth data

(56) References Cited

U.S. PATENT DOCUMENTS

| | | | |
|---|---|---|---|
| 2018/0317126 A1 | 11/2018 | Wang et al. | |
| 2019/0104424 A1 | 4/2019 | Hariharan et al. | |
| 2020/0220655 A1* | 7/2020 | Agarwal | H04L 43/12 |
| 2020/0275185 A1* | 8/2020 | Tong | H04L 1/1829 |
| 2020/0296793 A1* | 9/2020 | Cheong | H04W 88/06 |
| 2021/0105601 A1* | 4/2021 | Chen | H04W 4/80 |
| 2022/0053599 A1* | 2/2022 | Srivastava | H04W 76/40 |

FOREIGN PATENT DOCUMENTS

| | | | |
|---|---|---|---|
| CN | 110267305 A | | 9/2019 |
| CN | 110753284 A | * | 2/2020 |
| CN | 110995326 A | | 4/2020 |
| CN | 111031437 A | | 4/2020 |
| CN | 111435844 A | | 7/2020 |
| CN | 111436042 A | | 7/2020 |
| CN | 111436044 A | | 7/2020 |
| CN | 111447603 A | | 7/2020 |

OTHER PUBLICATIONS

The 1st Office Action regarding Chinese Patent Application No. CN202080001836.7, dated Apr. 27, 2021. English Translation Provided by http://globaldossier.uspto.gov.

* cited by examiner

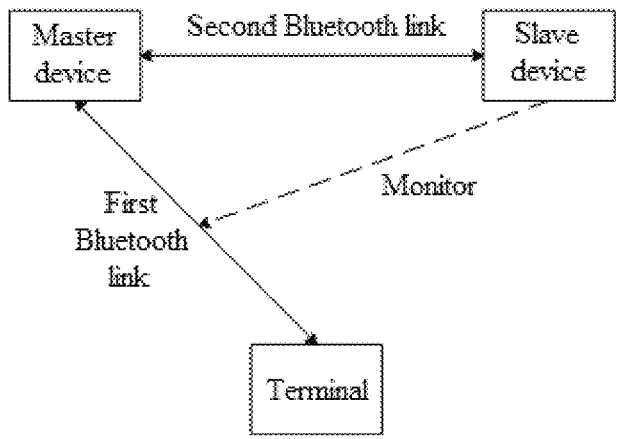

Figure 1

| 201 One of the master device and the slave device serve as a sender, the other one of the master device and the slave device serve as a receiver, and the receiver obtain a result of receiving the Bluetooth data by the sender |
|---|
| 202、In a case that one of the master device and the slave device fails to receive first Bluetooth data, a successful receiver forwards the first Bluetooth data in a predetermined downstream slot to a failed receiver via the second Bluetooth link, where the successful receiver is one of the master device and the slave device that successfully receives the first Bluetooth data, and the failed receiver is the one of the master device and the slave device that fails to receive the first Bluetooth data |

Figure 2

BLUETOOTH DATA FORWARDING METHOD AND DEVICE

This application is the national phase of International Application No. PCT/CN2020/111334, titled "COMMUNICATION METHOD FOR WIRELESS DEVICE, DEVICE AND COMPUTER READABLE STORAGE MEDIA", filed on Aug. 26, 2020, which is incorporated herein by reference in its entirety.

FIELD

The present disclosure relates to the field of wireless communication, and in particular to a communication method for a wireless device, a wireless device and a computer readable storage media.

BACKGROUND

With the progress of science and technology and the improvement of people's demands for modern life, Bluetooth wireless devices are popular with people since there is no wired connection between the player and the Bluetooth wireless device. It is very convenient to wear a Bluetooth wireless device in performing sports or other activities, avoiding the trouble caused by the entanglement of connecting wire.

According to the conventional technology, a communication method for a Bluetooth wireless device (including a mater device and a slave device) and a terminal is as follows. A first Bluetooth link is established between the terminal and the mater device. A second Bluetooth link is established between the mater device and the slave device. The slave device obtains link information of the first Bluetooth link via the second Bluetooth link. The terminal sends data to the mater device via the first Bluetooth link. The slave device monitors the first Bluetooth link based on the link information of the first Bluetooth link, receives the data, and synchronously plays the data based on the communication via the second Bluetooth link.

According to the above communication method for the wireless device, in a case that at least one of the master device and the slave device fails to receive data, it is required to inform the terminal to resend the data, and the master device and the slave device are required to receive and monitor data, increasing the burden of the terminal, the master device and the slave device. In addition, new data cannot be sent until the terminal resends the data which is not received successfully, extending the data transmission time and resulting in low transmission efficiency.

SUMMARY

A communication method for a wireless device, a wireless device and a computer readable storage media are provided according to the embodiments of the present disclosure to improve data transmission efficiency.

According to a first aspect of the present disclosure, a communication method for a wireless device is provided. The wireless device includes a master device and a slave device. The communication method for the wireless device may include:
  communicating, by the master device, with a terminal via a first Bluetooth link, communicating, by the master device, with the slave device via a second Bluetooth link, and sending, by the master device, link information of the first Bluetooth link to the slave device via the second Bluetooth link;
  monitoring, by the slave device, the first Bluetooth link, and receiving, by the slave device, Bluetooth data sent by the terminal to the master device;
  serving, by one of the master device and the slave device, as a sender, serving, by the other one of the master device and the slave device, as a receiver, and obtaining, by the receiver, a result of receiving the Bluetooth data by the sender; and
  forwarding, by a successful receiver, first Bluetooth data in a predetermined downstream slot to a failed receiver via the second Bluetooth link in a case that one of the master device and the slave device fails to receive the first Bluetooth data, where the successful receiver is one of the master device and the slave device that successfully receives the first Bluetooth data, and the failed receiver is the one of the master device and the slave device that fails to receive the first Bluetooth data.

In an embodiment, the communication method for a wireless device may further include:
  sending, by the receiver in a case that at least one of the master device and the slave device successfully receives the Bluetooth data sent in the current slot, a first response to the terminal in a current slot to instruct the terminal to send new Bluetooth data.

In an embodiment, the communication method for a wireless device may further include:
  sending, by the receiver in a case that both the master device and the slave device fail to receive the second Bluetooth data, a second response to the terminal in a current slot to instruct the terminal to resend second Bluetooth data.

In an embodiment, the communication method for a wireless device may further include:
  in a case that one of the master device and the slave device fails to receive the first Bluetooth data, registering, by the receiver, a complementing identifier for first Bluetooth data successfully received by the receiver, and registering, by the receiver, a missing identifier for first Bluetooth data unsuccessfully received by the receiver, where the receiver, in the predetermined downstream slot, forwards the Bluetooth data having the complementing identifier to the sender via the second Bluetooth link and requests the sender to send the first Bluetooth data having the missing identifier to the receiver; or
  in a case that only one of the master device and the slave device fails to receive the first Bluetooth data, registering, by the failed receiver that fails to receive the first Bluetooth data, a missing identifier for the first Bluetooth data, where the failed receiver, in the predetermined downstream slot, requests the successful receiver via the second Bluetooth link to forward the Bluetooth data having the missing identifier to the failed receiver.

In an embodiment, in a case that the Bluetooth data sent by the terminal to the wireless device is audio data, the communication method for a wireless device may further include:
  labeling, by the wireless device, the audio data sent by the terminal with sequence identifiers; and
  in sequentially decoding received audio data by the wireless device, suspending, by the wireless device in a case that a piece of audio data is missed, decoding the received audio data, and decoding, by the wireless device after the missed audio data is complemented, the complemented audio data.

In an embodiment, the method may further include:

in sequentially decoding received audio data by the wireless device, dynamically regulating, by the wireless device, a time interval between the predetermined downstream slot and a current slot based on a sequence identifier of the missed audio data for continuous decoding.

In an embodiment, the communication method for a wireless device may further include:

dynamically regulating, in a case that there is at least one piece of first Bluetooth data in an upstream slot, the time interval between the predetermined downstream slot and the current slot based on the number of pieces of missed first Bluetooth data or/and a total data volume of missed first Bluetooth data.

In an embodiment, the communication method for a wireless device may further include:

dynamically regulating, in a case that there is at least one piece of first Bluetooth data in an upstream slot, a duration of the predetermined downstream slot based on the number of pieces of missed first Bluetooth data or/and a total data volume of missed first Bluetooth data.

In an embodiment, in a case that there is at least one piece of first Bluetooth data, the communication method for a wireless device may further include:

re-determining roles of the master device and the slave device included in the wireless device in the predetermined downstream slot based on the number of pieces of first Bluetooth data missed by the master device and the number of pieces of first Bluetooth data missed by the slave device, where one of the master device and the slave device that misses a less number of pieces of the first Bluetooth data is re-determined as a new master device; or re-determining roles of the master device and the slave device included in the wireless device in the predetermined downstream slot based on remaining power of the master device and the slave device, where one of the master device and the slave device that has more remaining power is re-determined as a new master device.

According to a second aspect of the present disclosure, a computer device is provided. The computer device includes a processor. The processor is configured to execute a computer program stored in a memory to perform the communication method for a wireless device.

According to a third aspect of the present disclosure, a computer readable storage media storing a computer program is provided. The computer program, when executed by a processor, performs the communication method for a wireless device.

In the the communication method for a wireless device according to the present disclosure, in a case that one of the master device and the slave device fails to receive a piece of Bluetooth data (first Bluetooth data), the piece of Bluetooth data can be complemented between the master device and the slave device in a predetermined downstream slot, thereby improving the data transmission efficiency. In addition, it is unnecessary for the terminal to resend data in the case that one of the master device and the slave device fails to receive the data according to the method, thereby effectively reducing the power consumptions of the master device and the slave device.

BRIEF DESCRIPTION OF THE DRAWINGS

FIG. 1 is a schematic diagram showing communications between a master device and a slave device in a wireless device and a terminal according to the present disclosure;

FIG. 2 is a schematic diagram of a communication method for a wireless device according to an embodiment of the present disclosure;

DETAILED DESCRIPTION OF THE EMBODIMENTS

Figure 3:
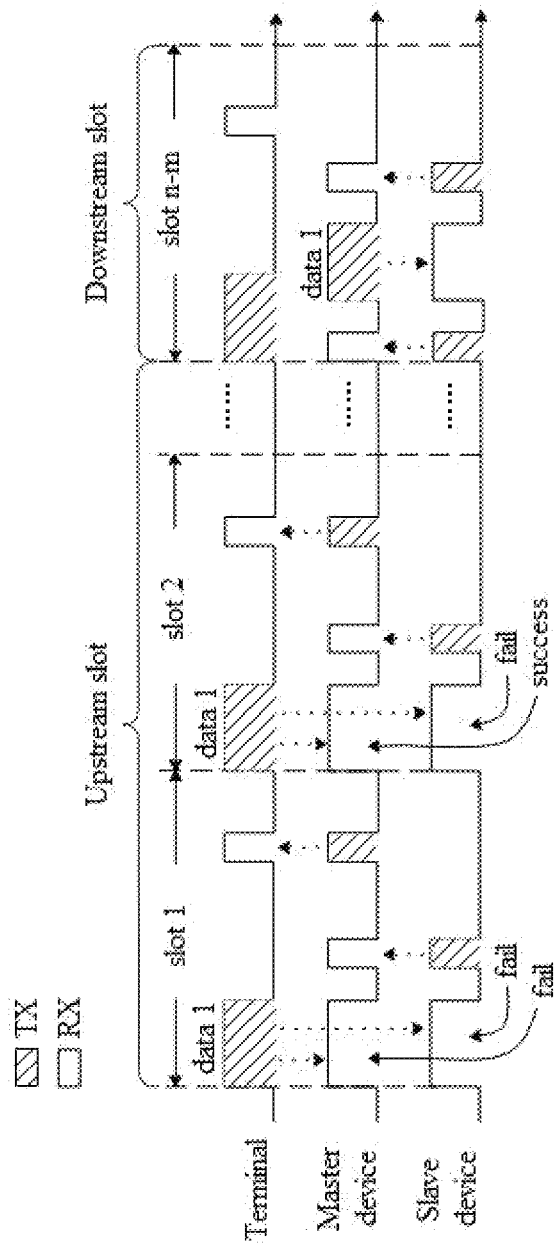
FIG. 3 is a timing diagram of a master device, a slave device and a terminal in performing a communication method for a wireless device according to a first embodiment of the present disclosure.

The technical solutions in the embodiments of the present disclosure are clearly and completely described below in conjunction with the drawings in the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

Terms of "the first", "the second", "the third", "the fourth" and the like (if exists) in the specification, the claims and the drawings of the present disclosure are used to distinguish an object from other similar objects rather than describe a specific order or a sequence. It should be understood that the above terms may be exchanged in proper cases so as to implement the embodiments described herein in other orders than an order shown or described herein. In addition, terms of "include", "comprise" or any other variants thereof are intended to be non-exclusive. For example, a process, a method, a system, a product or a device including a series of steps or units is not limited to including the listed steps or units but may include a step or a unit not listed and an inherent step or unit in the process, the method, the process or the device.

Reference is made to FIG. 1, which shows a basic communicational structure in the technology solutions according to the present disclosure. A master device communicates with a terminal via a first Bluetooth link, communicates with a slave device via a second Bluetooth link, and sends link information of the first Bluetooth link to the slave device via the second Bluetooth link. The slave device monitors the communication between the master device and the terminal based on the link information of the first Bluetooth link and obtains the content of the communication between the master device and the terminal.

Generally, the master device and the slave device perform timing synchronization via the second Bluetooth link. The slave device monitors the content of the communication between the master device and the terminal at time predetermined by the master device and the terminal. After both the master device and the slave device receive Bluetooth data (audio data), the master device and the slave device decode the Bluetooth data synchronously.

It should be understood that the wireless device in the present disclosure may be a Bluetooth headset, or may be other Bluetooth device such as a Bluetooth interphone and Bluetooth speaker pairs, which is not limited herein.

Based on the above communicational structure, a communication method for a wireless device is provided according to the present disclosure. The method includes the following steps 201 and 202.

In step 201, one of the master device and the slave device serves as a sender, the other one of the master device and the slave device serves as a receiver, and the receiver obtains a result of receiving Bluetooth data by the sender.

The sender receives Bluetooth data sent from the terminal, and sends a result (success or failure) of receiving the Bluetooth data to the receiver. The sender may send a result of receiving each piece of Bluetooth data sent by the terminal to the receiver via the second Bluetooth link. Alternatively, the sender may send a result of receiving Bluetooth data to indicate that the Bluetooth data is received successfully in a case that the sender successfully receives the Bluetooth data sent by the terminal, and does not send the result of receiving Bluetooth data to indicate that the Bluetooth data is not received successfully in a case that the sender does not successfully receive the Bluetooth data sent by the terminal.

In step 202, in a case that one of the master device and the slave device fails to receive first Bluetooth data, a successful receiver that successfully receives the first Bluetooth data forwards the first Bluetooth data in a predetermined downstream slot to a failed receiver.

In the embodiment, four roles are mentioned, including a receiver, a sender, a successful receiver and a failed receiver. The four roles are not fixedly assigned to the master device or the slave device. The four roles are assigned based on the communication between the master device and the slave device (for assigning the sender and the receiver) and based on a result of the communication between the master device and the terminal and a result of the communication between the slave device and the terminal (for assigning the successful receiver and the failed receiver). For example, during the communication between the master device and the slave device, in a case that the slave device sends a result of receiving Bluetooth data by the slave device to the master device to indicate that whether the slave device successfully receives the Bluetooth data, the slave device serves as the sender and the master device serves as the receiver. In this case, if the slave device successfully receives the Bluetooth data and the master device fails to receive the Bluetooth data, the slave device is the successful receiver, the master device is the failed receiver, and the slave device forwards the Bluetooth data to the master device in a predetermined downstream slot to complement the Bluetooth data missed by the master device. The roles of the master device and the slave device in this case may be exchanged. The mater device may serve as the sender and the successful receiver and the slave device may serve as the receiver and the failed receiver, or the master device may serve as the sender and the failed receiver and the slave device may server as the receiver and the successful receiver, or the master device may serve as the receiver and the successful receiver and the slave device may serve as the sender and the failed receiver, which does not affect the implementation of the solutions according to the present disclosure.

In the communication method for a wireless device according to the present disclosure, in a case that one of the master device and the slave device fails to receive a piece of Bluetooth data (first Bluetooth data), the piece of Bluetooth data can be complemented between the master device and the slave device in a predetermined downstream slot, thereby improving the data transmission efficiency. In addition, it is unnecessary for the terminal to resend data in the case that one of the master device and the slave device fails to receive the data according to the method, thereby effectively reducing the power consumptions of the master device and the slave device.

The slot in the present disclosure is based on a terminal slot. For the communication between the master device and the terminal, the communication between the slave device and the terminal, and the communication between the master device and the slave device, a time period includes one or more terminal slots. In one or more time periods, processes such as data transmission and result response are performed.

In the method, after the results of receiving Bluetooth data by the master device and the slave device are determined, it is required to respond to the terminal to instruct the terminal to resend the Bluetooth data in a case that the Bluetooth data is failed to be received or instruct the terminal to send new Bluetooth data in a case that the Bluetooth data is received successfully. Therefore, the method according to the present disclosure further includes: responding, by the receiver, to the terminal in a current slot based on a result of receiving Bluetooth data by the receiver and a result of receiving Bluetooth data by the sender. Detailed descriptions are as follows.

In at least one terminal slot, in a case that the master device and the slave device fail to receive the Bluetooth data in the current slot, the receiver responds to the terminal in the current slot to instruct the terminal to resend the Bluetooth data.

In at least one terminal slot, in a case that at least one of the master device and the slave device successfully receives the Bluetooth data in the current slot, the receiver responds to the terminal in the current slot to instruct the terminal to send new Bluetooth data.

The Bluetooth data sent in different slots may be the same or different. If the master device and the slave device fail to receive a piece of Bluetooth data (second Bluetooth data) from the terminal in a current slot, a response is sent to the terminal in the current slot to instruct the terminal to resend the Bluetooth data in a next slot, thus the Bluetooth data sent by the terminal in the current slot and in the next slot is the same. If at least one of the master device and the slave device successfully receives the Bluetooth data sent from the terminal, a response is sent to the terminal in the current slot to instruct the terminal to send new Bluetooth data in a next slot, thus the Bluetooth data sent by the terminal in the current slot and in the next slot is different.

After receiving a result of receiving Bluetooth data by the sender, the receiver obtains a comprehensive result of receiving Bluetooth data by the receiver and the sender based on a result of receiving Bluetooth data by the receiver. The comprehensive result includes the following four cases. In case 1, the receiver is a failed receiver and the sender is a failed receiver. In case 2, the receiver is a successful receiver and the sender is a successful receiver. In case 3, the receiver is a successful receiver and the sender is a failed receiver. In case 4, the receiver is a failed receiver and the sender is a successful receiver. In a case that the receiver and the sender fail to receive Bluetooth data, that is, in the case 1, the receiver responds to the terminal with a NACK response (second response) in the current slot to indicate that the master device and the slave device fail to receive the Bluetooth data and request the terminal to resend the Bluetooth data. In a case that at least one of the receiver and the sender successfully receives the Bluetooth data, that is, in the cases 2, 3 and 4, the receiver responds to the terminal with an ACK response (first response) in the current slot to indicate that the master device and the slave device successfully receive the Bluetooth data and request the terminal to send new Bluetooth data.

In a case that the slave device serves as the receiver, the slave device may send the first response or the second response to the terminal based on the obtained parameters of the first Bluetooth link.

Based on the above embodiments, the sender only knows the result of receiving Bluetooth data by the sender and does not know the response sent by the receiver. Therefore, in the method, the sender may monitor the response sent by the receiver to the terminal.

After obtaining the response sent by the receiver to the terminal, the sender may derive the following cases based on the result of receiving Bluetooth data by the sender. In case a, the sender is a failed receiver, the response is a NACK response, and the receiver is a failed receiver. In case b, the sender is a failed receiver, the response is an ACK response, and the receiver is a successful receiver. In case c, the sender is a successful receiver, the response is an ACK response, and the receiver is a successful receiver or a failed receiver.

It can be seen from the above analysis that, the receiver may know the results of receiving Bluetooth data by the receiver and the sender in the current slot, and the sender, after successfully receives the Bluetooth data, does not know whether the receiver misses the Bluetooth data. Therefore, in the method, in the case that one of the master device and the slave device fails to receive the Bluetooth data, the failed receiver registers a missing identifier for the unsuccessfully received Bluetooth data.

In an embodiment, the master device is required to inform the slave device of the Bluetooth data missed by the master device, so that the slave device forwards the missed Bluetooth data to the master device, and the slave device is required to inform the master device of the Bluetooth data missed by the slave device, so that the master device forwards the missed Bluetooth data to the slave device. Therefore, the failed receiver instructs the successful receiver in a downstream slot based on a missing identifier registered by the failed receiver to forward the Bluetooth data having a missing identifier.

In the cases 2 and 3, the receiver is a successful receiver, and it is unnecessary for the receiver to register a missing identifier. In the cases 1 and 4, the receiver is a failed receiver. In the case 1, the receiver is a failed receiver and the sender is a failed receiver, it is unnecessary for the failed receivers to register a missing identifier since the receiver responds to the terminal with a NACK response to instruct the terminal to resend the Bluetooth data. After one of the master device and the slave device successfully receives Bluetooth data, it is determined whether to register a missing identifier. In the case 4, the receiver is a failed receiver and the sender is a successful receiver, and it is required for the failed receiver, that is, the receiver, to register a missing identifier to inform the successful receiver in a downstream slot of the Bluetooth data missed by the failed receiver and instruct the successful receiver to forward the missed Bluetooth data.

In the case c, the sender is a successful receiver, and it is unnecessary for the sender to register a missing identifier. In the cases a and b, the sender is a failed receiver. In the case a, the sender is a failed receiver, the receiver responds to the terminal with a NACK response, thus the receiver is a failed receiver, and it is unnecessary for the failed receivers to register a missing identifier. In the case b, the sender is a failed receiver, the receiver responds to the terminal with an ACK response, thus the receiver is a successful receiver, and it is required for the failed receiver to register a missing identifier, so that the failed receiver requests the successful receiver in a predetermined downstream slot via the second Bluetooth link to forward the Bluetooth data having the missing identifier to the failed receiver.

As described above, the slot in which the failed receiver sends the registered missing identifier to the successful receiver is a downstream slot according to the present disclosure. The failed receiver may send multiple missing identifiers to the successful receiver in the downstream slot. In a current slot, after the receiver determines the failed receiver and it is required for the receiver to register a missing identifier, the receiver registers a missing identifier if the receiver is the failed receiver, and the receiver informs the sender to register a missing identifier for the Bluetooth data transmitted in the current slot if the sender is the failed receiver. Then, in the downstream slot, the master device and the slave device respectively send the missing identifiers registered by the master device and the slave device to each other to complement the Bluetooth data missed by the master device and the slave device.

In another embodiment, since the receiver knows the failed receiver and the successful receiver, it is only required to for the receiver to register an identifier for the Bluetooth data missed by the sender. Therefore, in a case that one of the master device and the slave device fails to receive the Bluetooth data and the receiver is a successful receiver, the receiver registers a complementing identifier for the Bluetooth data.

In the cases 2 and 4, the sender is a successful receiver. In the cases 1 and 3, the sender is a failed receiver. In the case 1, the receiver is a failed receiver and the sender is a failed receiver, it is unnecessary to register a missing identifier or a complementing identifier since the receiver responds to the terminal with a NACK response to instruct the terminal to resend the Bluetooth data. After one of the master device and the slave device successfully receives the Bluetooth data, it is determined whether to register a missing identifier or a complementing identifier. In the case 2, the receiver is a successful receiver and the sender is a successful receiver, thus it is unnecessary to register a missing identifier and a complementing identifier. In the case 3, the receiver is a successful receiver and the sender is a failed receiver, and it is required to register a complementing identifier, so that the successful receiver forwards the Bluetooth data having the complementing identifier to the failed receiver in the predetermined downstream slot via the second Bluetooth link. In the case 4, the receiver is a failed receiver and the sender is a successful receiver, and it is required to register a missing identifier to inform the successful receiver in the downstream slot of the missed Bluetooth data.

In the method, after the successful receiver forwards the Bluetooth data to the failed receiver, the failed receiver responds to the successful receiver based on a result of receiving the forwarded Bluetooth data by the failed receiver. If the failed receiver fails to receive the forwarded Bluetooth data, the failed receiver instructs the successful receiver to retransmit the forwarded audio data. If the failed receiver successfully receives the forwarded Bluetooth data, the Bluetooth data missed by the master device and the slave device is complemented.

In the method, the upstream slot and the downlink slot includes at least one terminal slot. In at least one terminal slot included in the upstream slot, if one of the master device and the slave device fails to receive the Bluetooth data, the Bluetooth data is forwarded by the successful receiver to the failed receiver in the downstream slot.

The upstream slot may include at least one terminal slot, and the downstream slot may include at least one terminal slot. In the upstream slot, the master device communicates with the terminal and the slave device monitors the communication between the master device and the terminal. In the downstream slot, the Bluetooth data missed by the master device and the slave device are complemented. In the method, one period includes at least one upstream slot and at least one downstream slot. In one period, if one of the master device and the slave device fails to receive Bluetooth data, the Bluetooth data is forwarded and complemented.

In the Bluetooth device, after data is received, the data is stored in a buffer, is decoded, and then is played by a speaker. According to the method, in a case that a piece of Bluetooth data is missed, if a next piece of Bluetooth data of the missed Bluetooth data is decoded after a previous piece of data of the missed Bluetooth data is decoded, the Bluetooth data is confused. Therefore, the method may further include: labeling, by the master device and the slave device in at least one upstream slot, the Bluetooth data received in all slots with sequence identifiers; and in sequentially decoding received audio data by the wireless device, suspending, by the wireless device in a case that a piece of audio data is missed, decoding the received audio data, and decoding, by the wireless device after the missed audio data is complemented, the complemented audio data.

Optimally, according to the method, the position of the downstream slot may be regulated.

In an embodiment, in a case that one of the master device and the slave device fails to receive Bluetooth data in at least one terminal slot, the position of the downstream slot is dynamically regulated based on the number of pieces of missed first Bluetooth data or a total data volume of the missed first Bluetooth data. In the present disclosure, the regulation of the position of the downstream slot is performed by regulating the time interval between the downstream slot and the current slot to advance or postpone complementing the missed Bluetooth data in the downstream slot. The total data volume is equal to a size of storage space occupied by all the missed first Bluetooth data in a statistical period.

The position of the downstream slot may be dynamically regulated based on the number of cases in which one of the master device and the slave device fails to receive Bluetooth data, that is, based on a total number of missing identifiers registered by the receiver and the sender or a total number of missing identifiers and complementing identifiers registered by the receiver. Before the master device and the slave device start to operate, a threshold of the total number of pieces of Bluetooth data to be forwarded in the downstream slot and a forwarding time instant may be preset. In a case that the total number of pieces of Bluetooth data to be forwarded does not reach the preset threshold and the forwarding time instant is reached, the position of the downstream slot may be dynamically regulated to appropriately delay the forwarding time instant. In a case that the total number of pieces of Bluetooth data to be forwarded reaches the preset threshold and the forwarding time instant is not reached, the position of the downstream slot may be dynamically regulated to appropriately advance the forwarding time instant.

In the case that one of the master device and the slave device fails to receive the Bluetooth data, the position of the downstream slot may be dynamically regulated based on the data volume of the unsuccessfully received Bluetooth data, that is, based on the data volume of the Bluetooth data having a missing identifier registered by the failed receiver. Before the master device and the slave device start to operate, a threshold of the data volume of Bluetooth data to be forwarded in the downstream slot and a forwarding time instant may be preset. In a case that the data volume of the Bluetooth data to be forwarded does not reach the preset threshold and the forwarding time instant is reached, the position of the downstream slot may be dynamically regulated to appropriately delay the forwarding time instant. In a case that the data volume of the Bluetooth data to be forwarded reaches the preset threshold and the forwarding time instant is not reached, the position of the downstream slot may be dynamically regulated to appropriately advance the forwarding time instant.

In another embodiment, in a case that one of the master device and the slave device fails to receive Bluetooth data in at least one terminal slot, the position of the downstream slot is dynamically regulated based on a sequence identifier of the missed Bluetooth data. As descried above, the master device and the slave device label the Bluetooth data received in all slots with sequence identifiers and sequentially decode received Bluetooth data for playing. In the case that one of the master device and the slave device fails to receive the Bluetooth data, if the missed Bluetooth data has a sequence identifier indicating a chronologically earlier position, the position of the downstream slot may be dynamically regulated to appropriately advance the forwarding time instant, ensuring subsequent decoding and playing is performed smoothly; and if the missed Bluetooth data has a sequence identifier indicating a chronologically later position, the position of the downstream slot may be dynamically regulated to appropriately delay the forwarding time instant.

It should be noted that in the Bluetooth device, a time period is required for receiving, buffering and playing the data. A sum of the durations of the upstream slot and the predetermined downstream slot should be equal to or less than the time period.

Optimally, according to the method, the duration of the communication in which the successful receiver forwards Bluetooth data to the failed receiver may be regulated in the downstream slot.

In an embodiment, in a case that one of the master device and the slave device fails to receive Bluetooth data in at least one terminal slot, the receiver dynamically regulates the duration of the communication between the master device and the slave device in the downstream slot (the duration of the downstream slot) based on the number of pieces of Bluetooth data successfully received by the receiver.

The duration of the communication between the master device and the slave device in the downstream slot may be dynamically regulated based on the number of the cases in which one of the master device and the slave device fails to receive the Bluetooth data, that is, based on the total number of missing identifiers registered by the receiver and the sender or based on the total number of missing identifiers and complementing identifiers registered by the receiver.

Before the master device and the slave device start to operate, a threshold of the duration of the communication between the master device and the slave device in the downstream slot may be preset. The preset threshold of the duration of the communication corresponds to the number of cases in which Bluetooth data is failed to be received. In a case that the duration of the communication is greater than the preset threshold, the duration of the communication may be dynamically regulated to appropriately extend the duration of the communication. In a case that the duration of the communication is less than or equal to the preset threshold, the duration of the communication may be dynamically regulated to appropriately shorten the duration of the communication.

In another embodiment, in the case that one of the master device and the slave device fails to receive Bluetooth data in at least one terminal slot, the receiver dynamically regulates the duration of the communication between the master device and the slave device in the downstream slot based on the number of pieces of Bluetooth data unsuccessfully received by the receiver and the number of pieces of Bluetooth data unsuccessfully received by the sender.

In the case that one of the master device and the slave device fails to receive Bluetooth data, the receiver dynamically regulates the duration of the communication in which Bluetooth data is forwarded between the master device and the slave device based on the data volume of the Bluetooth data unsuccessfully received by the receiver and the data volume of the Bluetooth data unsuccessfully received by the sender, that is, based on the data volume of the Bluetooth data having a missing identifier registered by the receiver and the data volume of the Bluetooth data having a missing identifier registered by the sender. Before the master device and the slave device start to operate, the duration of the communication between the master device and the slave device in the downstream slot may be preset. The preset duration of the communication corresponds to a data volume of Bluetooth data to be forwarded. In a case that the duration of the communication in which the receiver and the sender forward missed Bluetooth data to each other is greater than the preset duration of the communication, the duration of the communication may be dynamically regulated to appropriately extend the duration of the communication. In a case that the duration of the communication in which the receiver and the sender forward missed Bluetooth data to each other is less than the preset duration of the communication, the duration of the communication may be dynamically regulated to appropriately shorten the duration of the communication.

In the case that one of the master device and the slave device fails to receive Bluetooth data, the receiver may dynamically regulate the duration of the communication in which the master device and the slave device forward Bluetooth data based on the data volume of the Bluetooth data unsuccessfully received by the receiver and the data volume of the Bluetooth data successfully received by the receiver, that is, based on the data volume of the Bluetooth data having a missing identifier registered by the receiver and the data volume of the Bluetooth data having a complementing identifier registered by the receiver. Similarly, the duration of the communication between the master device and the slave device may be preset. In a case that the duration of the communication in which the receiver and the sender forward missed Bluetooth data to each other is greater than the preset duration of the communication, the duration of the communication may be dynamically regulated to appropriately extend the duration of the communication. In a case that the duration of the communication in which the receiver and the sender forward missed Bluetooth data to each other is less than the preset duration of the communication, the duration of the communication may be dynamically regulated to appropriately shorten the duration of the communication.

Based on the above embodiments, before the position of the downstream slot and/or the duration of the communication between the master device and the slave device in the downstream slot are regulated, the master device and the slave device perform a negotiation in the communication via the second Bluetooth link to determine the position of the downstream slot and the duration of the communication based on the Bluetooth data missed by the master device and the Bluetooth data missed by the slave device. The negotiation may be performed in a previous slot of the preset downstream slot or in each of current slots in which one of the master device and the slave device fails to receive Bluetooth data.

It should be noted that the master device and the slave device stop communicating with the terminal in complementing each other missed Bluetooth data. After sending new Bluetooth data, the terminal resends the Bluetooth data if the terminal does not receive a response. The number of times the terminal resends the Bluetooth data is less than a maximum number of attempts defined in Bluetooth protocol. Therefore, the duration of the downstream slot is less than the duration in which the terminal transmits the same piece of Bluetooth data with the maximum number of attempts, so that the master device and the slave device, after complementing each other missed Bluetooth data, can communicate with the terminal to receive new Bluetooth data.

In the above embodiments, the receiver communicates with the terminal and communicates with the sender, thus the power consumption of the receiver is greater than the power consumption of the sender. The master device or the slave device may serve as the receiver, or the master device and the slave device may alternately serve as the receiver. The power consumptions of the master device and the slave device may be balanced if the master device and the slave device alternately serve as the receiver. However, for each alternation between the master device and the slave device, it is required for the master device and the slave device to communicate with each other to transfer authority, which is tedious and complicated. Although the power consumptions of the master device and the slave device are balanced, communications for multiple alternations results in high power consumptions. Therefore, in a simple way, one of the master device and the slave device may fixedly serves as the receiver. However, the one of the master device and the slave device that fixedly serves as the receiver consumes more power, without balancing the power consumptions of the master device and the slave device. In addition, if the master device cannot communicate with the terminal normally, the results of receiving data by the master device and the slave device may be affected, resulting in too much missed Bluetooth data and reducing communication efficiency.

Therefore, the method further includes: switching the roles of the master device and the slave device after at least one downstream slot. The roles of the master device and the slave device may be re-determined in a downstream slot based on the number of pieces of Bluetooth data missed by the master device and the number of pieces of Bluetooth data missed by the slave device. The master device and the slave device calculate the number of pieces of Bluetooth data respectively missed by the master device and the slave device in the downstream slot (or the receiver calculates the number of the missing identifiers and the number of the complementing identifiers). The calculation result may indicate the stability of the communication between the master device and the terminal and the stability of the communication between the slave device and the terminal. A less number of pieces of missed Bluetooth data indicates more stable communication with the terminal and higher communication efficiency. Alternatively, the roles of the master device and the slave device may be re-determined based on a comparison of the remaining power of the master device and the slave device, thereby balancing the remaining power of the master device and the slave device.

It should be noted that, in order to ensure that the reception of new Bluetooth data is not affected after the roles of the master device and the slave device are switched, a sum of the duration of the downstream slot and the duration in which the roles of the master device and the slave device are switched is less than the duration in which the terminal transmits the same piece of Bluetooth data with the maximum number of attempts.

In order to facilitate understanding, following application embodiments in which audio data, as the Bluetooth data, is transmitted are provided according to the present disclosure. The embodiments disclosed below are only exemplary and are used for helping those skilled in the art better understand the above descriptions.

First Embodiment

The first embodiment is a basic embodiment of the present disclosure. Reference is made to FIG. 2, which is a timing diagram of a master device, a slave device and a terminal in performing the communication method for a wireless device. In FIG. 3, the upstream slot includes slot 1 to slot n−m−1, and the downstream slot includes a slot n−m. For the process of complementing the audio data missed by the master device and the slave device, one period includes n−m slots. In the upstream slot, the master device communicates with the terminal to receive audio data, the slave device monitors and receives the audio data. The master device serves as the receiver and the slave device serves as the sender. In the downstream slot, the process of complementing missed audio data is performed.

As shown in FIG. 3, in the slot 1 of the upstream slot, the master device fails to receive audio data data1 sent by the terminal, the slave device fails to monitor and receive the audio data data1, and the master device, after receiving a result of receiving data by the slave device, responds to the terminal with a NACK response in the current slot 1 to instruct the terminal to resend the audio data data1 in slot 2. In the slot 2, the terminal resends the audio data data1, the master device successfully receives the audio data data1, the slave device fails to monitor and receive the audio data data1, the master device, after receiving a result of receiving data by the slave device, responds to the terminal with an ACK response in the current slot 2 to instruct the terminal to send new audio data in a next slot, and the master device registers a complementing identifier for the audio data data1. After multiple slots of the upstream slot, the master device and the slave data complement each other the missed audio data in the slot n−m of the downstream slot. As shown in FIG. 3, the audio data missed by the slave device is data1, the master device forwards the audio data data1 to the slave device based on the complementing identifier of the audio data data1, and the slave device, after receiving the audio data data1 forwarded by the master device, responds to the master with a result of receiving data by the slave device.

Second Embodiment

As an optimized embodiment based on the first embodiment, the second embodiment is different from the first embodiment. In the second embodiment, the position of the downstream slot is dynamically regulated. Based on the above embodiments, in a case that a few pieces of audio data is to be forwarded in the upstream slot, the position of the downstream slot may be dynamically regulated to appropriately delay the time instant at which the audio data is forwarded.

Figure 4A:
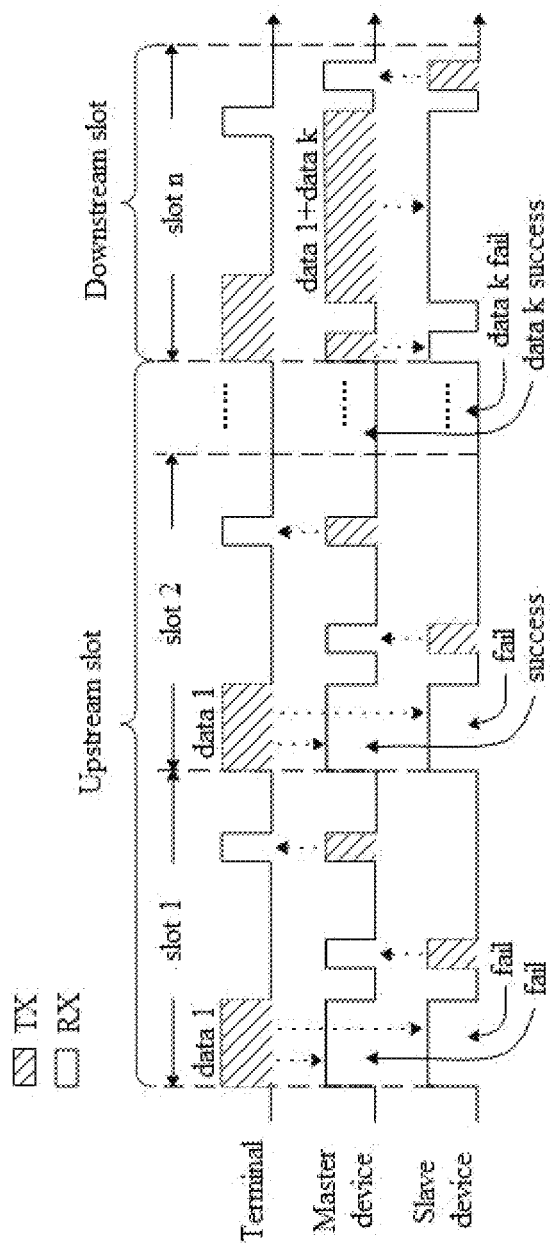
FIG. 4A and FIG. 4B are timing diagrams of a master device, a slave device and a terminal in performing a communication method for a wireless device according to a second embodiment of the present disclosure.
Figure 4B:
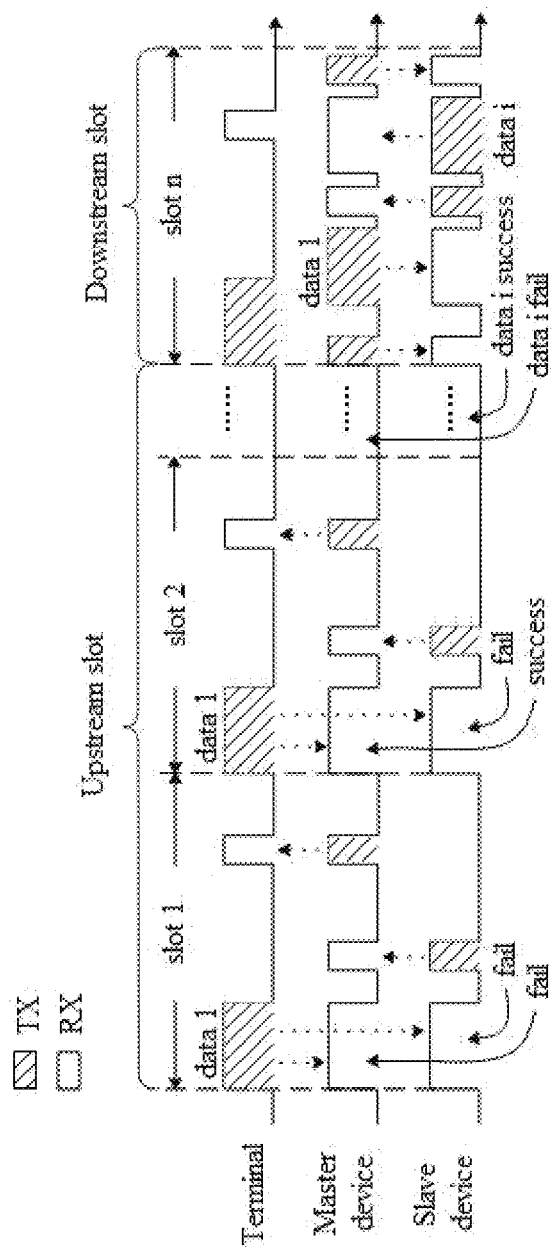

Reference is made to FIG. 4A and FIG. 4B, in which the upstream slot includes slot 1 to slot n−1 and the downstream slot includes a slot n. For the process of complementing the audio data missed by the master device and the slave device, one period includes n slots. In the slot 1 of the upstream slot, the master device and the slave device fail to receive audio data data1 sent by the terminal. In slot 2, the data data1 is resent, the master device successfully receives the data data1, the slave device fails to receive the data data1, and the master device registers a complementing identifier for the audio data data1.

In one case, as shown in FIG. 4A, after the position of the downstream slot is dynamically regulated, in a subsequent slot of the upstream slot, the master device successfully receives audio data data(k) sent by the terminal, the slave device fails to receive the audio data data(k), and the master device registers a complementing identifier for the audio data data(k). In the slot n of the downstream slot, the master device and the slave device complement the missed audio data. As shown in FIG. 4A, the audio data missed by the slave device includes data1 and data(k), the master device forwards the audio data data1 and data(k) to the slave device based on the complementing identifiers, and the slave device, after receiving the audio data data1 forwarded by the master device, responds to the master device with a result of receiving data by the slave device.

In another case, as shown in FIG. 4B, after the position of the downstream slot is dynamically regulated, in a subsequent slot of the upstream slot, the master device fails to receive audio data data(i) sent by the terminal, the slave device successfully receives the audio data data(i), and the master device registers a complementing identifier for the audio data data(i). In the slot n of the downstream slot, the master device and the slave device complement the missed audio data. As shown in FIG. 4B, the audio data missed by the slave device is data1 and the audio data missed by the master device is data(i), the master device forwards the audio data data1 to the slave device based on the complementing identifier and informs the slave device to forward the audio data data(i) to the master device based on the missing identifier. The master device and the slave device complement each other missed audio data in a time division multiplexing mode. After forwarding the missed audio data, the master device responds to the slave device with a result of receiving data by the master device, and the slave device responds to the master device with a result of receiving data by the slave device.

Third Embodiment

As an optimized embodiment based on the first embodiment, the third embodiment is different from the first embodiment. In the third embodiment, the duration of the communication between the mater device and the slave device in the downstream slot is dynamically regulated. Based on the above embodiments, in a case that multiple pieces of audio data is to be forwarded in the upstream slot, the duration of the communication between the mater device and the slave device in the downstream slot may be dynamically regulated to appropriately extend the duration of the communication.

Figure 5:
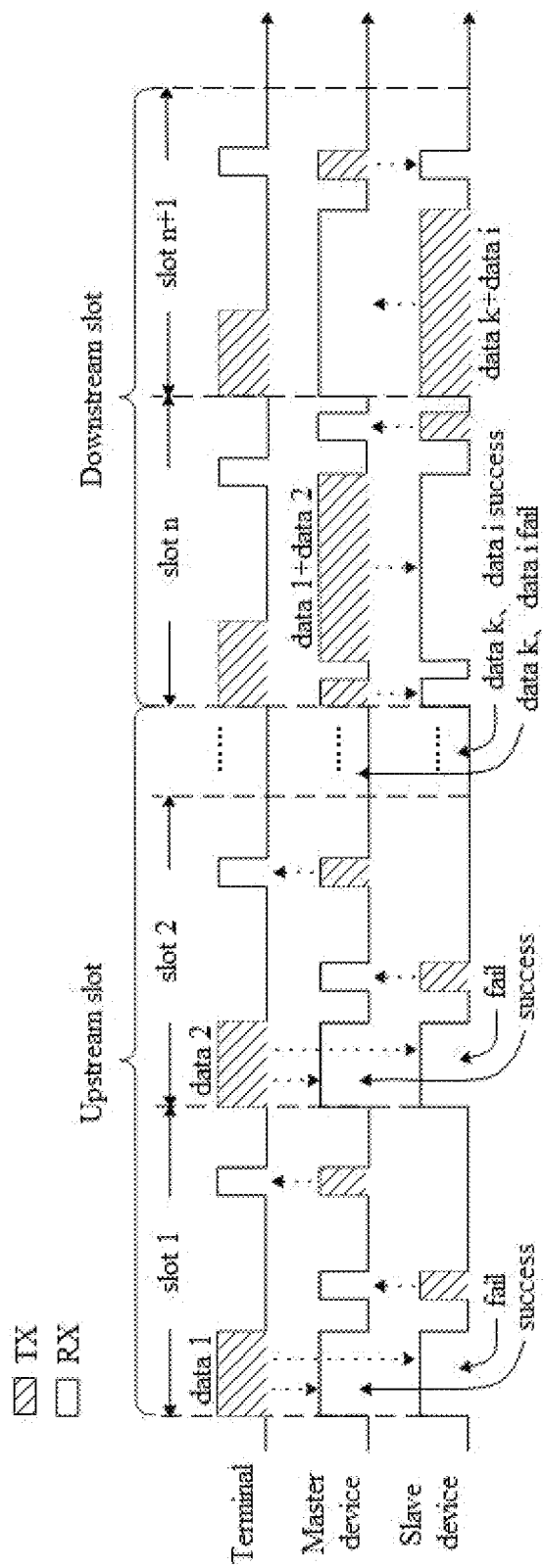
FIG. 5 is a timing diagram of a master device, a slave device and a terminal in performing a communication method for a wireless device according to a third embodiment of the present disclosure.

Reference is made to FIG. 5, in which the upstream slot includes slot 1 to slot n−1 and the downstream slot includes slot n and slot n+1. For the process of complementing the audio data missed by the master device and the slave device, one period includes (n+1) slots. In the slot 1 of the upstream slot, the master successfully receives audio data data1 sent by the terminal, the slave device fail to receive the audio data data1. The master successfully receives audio data data2, and the slave device fail to receive the audio data data2. The master device registers a complementing identifier for the audio data data1 and a complementing identifier for the audio data data2. Similarly, the mater device fails to receive audio data data(k) and audio data data(i), and the slave device successfully receives the audio data data(k) and the audio data data(i). The master device registers a missing identifier for the audio data data(k) and a missing identifier for the audio data data(i).

In the downstream slot, there are multiple pieces of audio data to be forwarded, including data1, data2, data(k) and data(i). Therefore, the duration of the communication between the master device and the slave device in the downstream slot is dynamically regulated. The duration of the communication includes slot n and slot n+1. Referring to FIG. 5, in the slot n of the downstream slot, the master device forwards the audio data data1 and the audio data data2 to the slave device based on the complementing identifiers, and informs the slave device to forward the audio data data(k) and the audio data data(i) to the master device in the slot n+1 of the downstream slot based on the missing identifiers. The master device and the slave device complement each other missed audio data in a time division multiplexing mode. After forwarding the missed audio data, the master device responds to the slave device with a result of receiving data by the master device, and the slave device responds to the master device with a result of receiving data by the slave device.

Fourth Embodiment

As an optimized embodiment based on the first embodiment, the fourth embodiment is different from the first embodiment. In the fourth embodiment, the master device and the slave device are switched after the downstream slot. Based on the above embodiments, the roles of the master device and the slave device are switched after at least one downstream slot. The roles of the master device and the slave device may be re-determined in a downstream slot based on the number of pieces of Bluetooth data missed by the master device and the number of pieces of Bluetooth data missed by the slave device. Alternatively, the roles of the master device and the slave device may be re-determined based on a comparison of remaining power of the master device and the slave device.

Figure 6A:
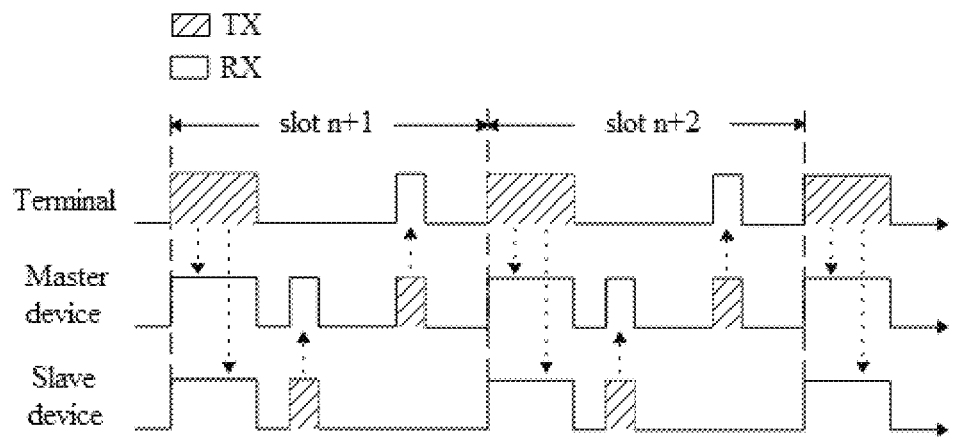
FIG. 6A is a timing diagram of a master device, a slave device and a terminal before switching the master device and the slave device according to a fourth embodiment of the present disclosure.
Figure 6B:
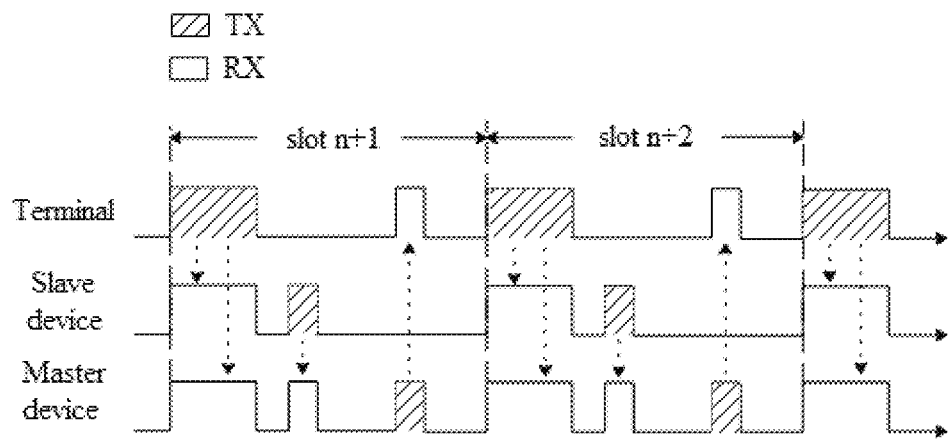
FIG. 6B is a timing diagram of a master device, a slave device and a terminal after switching the master device and the slave device according to a fourth embodiment of the present disclosure.

Reference is made to FIG. 6A and FIG. 6B. FIG. 6A is a timing diagram of a master device, a slave device and a terminal before switching the master device and the slave device after the downstream slot. FIG. 6B is a timing diagram of a master device, a slave device and a terminal after switching the master device and the slave device after the downstream slot. As shown in FIG. 6A, before the master device and the slave device are switched, the master device, serving as a receiver, communicates with the terminal and communicates with the slave device. The master device has a heavy burden and a high power consumption, and the power consumptions of the master device and the slave device are not balanced. As shown in FIG. 6B, after the master device and the slave device are switched, the original master device is switched as a new slave device and the original slave device is switched as a new master device, and the new master device replaces the original master device to serve as the receiver, thereby balancing the power consumptions of the master device and the slave device.

Based on the above descriptions and embodiments, a Bluetooth device is further provided according to the present disclosure. The Bluetooth device includes a memory and a processor. The memory stores a computer program. The Bluetooth device executes the computer program by using the processor to perform the communication method for a wireless device. For the descriptions relevant to the device, one may refer to relevant descriptions and effects of the above embodiments for understanding, which are not repeated herein.

Based on the above descriptions and embodiments, a (non-transitory) computer readable storage medium is further provided according to the present disclosure. The non-transient computer readable storage medium stores a computer program. The computer program, when executed by a processor, performs the communication method for a wireless device. For the descriptions of the program, one may refer to the relevant descriptions and effects of the above embodiments for understanding, which are not repeated herein.

The essential part of the technical solution of the present disclosure or the part of the technical solution of the present disclosure contributed to the conventional technology or all of or a part of the technical solution may be embodied in a form of a software product. The computer software product is stored in a storage medium which includes several instructions to make a computer device (may be a personal computer, a server, a network device or the like) execute all or a part of steps of the method according to each embodiment of the present disclosure. The storage medium described above includes various mediums which can store program codes, such as a USB flash disk, a mobile hard disk, a read-only memory (abbreviated as "ROM"), a random access memory (abbreviated as "RAM"), a disk, and an optical disc.

The embodiments described above are only provided for describing the technical solutions of the present disclosure rather than limiting the technical solutions. Although the present disclosure is described in detail with reference to the embodiments described above, those skilled in the art should understand that modifications may be made to the technical solutions described in the above embodiments or equivalent substitutions may be made to a part or all of the technical features. These modifications or substitutions do not enable the essence of the corresponding technical solutions to depart from the scope of the technical solutions according to the embodiments of the present disclosure.

The invention claimed is:

1. A communication method for a wireless device, wherein:
   the wireless device comprises a master device and a slave device; and
   the communication method for the wireless device comprises:

communicating, by the master device, with a terminal via a first Bluetooth link, communicating, by the master device, with the slave device via a second Bluetooth link, and sending, by the master device, link information of the first Bluetooth link to the slave device via the second Bluetooth link;

monitoring, by the slave device, the first Bluetooth link, and receiving, by the slave device, Bluetooth data sent by the terminal to the master device;

serving, by one of the master device and the slave device, as a sender, serving, by the other one of the master device and the slave device, as a receiver, and obtaining, by the receiver, a result of receiving the Bluetooth data by the sender;

forwarding, by a successful receiver, first Bluetooth data in a predetermined downstream slot to a failed receiver via the second Bluetooth link if one of the master device and the slave device fails to receive the first Bluetooth data, wherein the successful receiver is one of the master device and the slave device that successfully receives the first Bluetooth data, and the failed receiver is the one of the master device and the slave device that fails to receive the first Bluetooth data;

monitoring, by the sender, a response sent by the receiver to the terminal;

dynamically regulating, if there is at least one piece of first Bluetooth data in an upstream slot, the time interval between the predetermined downstream slot and the current slot based on the number of pieces of missed first Bluetooth data or/and a total data volume of missed first Bluetooth data; and dynamically regulating a position of the predetermined downstream slot based on a threshold of a total number of pieces of the first Bluetooth data to be forwarded in the predetermined downstream slot and a forwarding time instant or based on a threshold of a data volume of the first Bluetooth data to be forwarded in the downstream slot and a forwarding time instant.

2. The method according to claim 1, further comprising:
sending, by the receiver if at least one of the master device and the slave device successfully receives the Bluetooth data sent in a current slot, a first response to the terminal in a slot to instruct the terminal to send new Bluetooth data in.

3. The method according to claim 1, further comprising:
sending, by the receiver if both the master device and the slave device fail to receive second Bluetooth data, a second response to the terminal in a current slot to instruct the terminal to resend the second Bluetooth data.

4. The method according to claim 1, wherein if the Bluetooth data sent by the terminal to the wireless device is audio data, the method further comprises:
labeling, by the wireless device, the audio data sent by the terminal with sequence identifiers; and
in sequentially decoding received audio data by the wireless device, suspending, by the wireless device if a piece of audio data is missed, decoding the received audio data, and decoding, by the wireless device after the missed audio data is complemented, the complemented audio data.

5. The method according to claim 4, further comprising:
in sequentially decoding received audio data by the wireless device, dynamically regulating, by the wireless device, a time interval between the predetermined downstream slot and a current slot based on a sequence identifier of the missed audio data for continuous decoding.

6. The method according to claim 1, further comprising:
dynamically regulating, if there is at least one piece of first Bluetooth data in an upstream slot, a duration of the predetermined downstream slot based on the number of pieces of missed first Bluetooth data or/and a total data volume of missed first Bluetooth data.

7. The method according to claim 1, wherein if there is at least one piece of first Bluetooth data, the method further comprises:
re-determining roles of the master device and the slave device comprised in the wireless device in the predetermined downstream slot based on the number of pieces of first Bluetooth data missed by the master device and the number of pieces of first Bluetooth data missed by the slave device, wherein one of the master device and the slave device that misses a less number of pieces of the first Bluetooth data is re-determined as a new master device: or
re-determining roles of the master device and the slave device comprised in the wireless device in the predetermined downstream slot based on remaining power of the master device and the slave device, wherein one of the master device and the slave device that has more remaining power is re-determined as a new master device.

8. A wireless device, comprising
a non-transitory memory, storing a computer program; and
a processor, configured to execute the computer program stored in the non-transitory memory to perform the method according to claim 1.

9. A computer readable non-transitory storage medium storing a computer program, wherein the computer program, when executed by a processor, performs the method according to claim 1.

10. The method according to claim 1, further comprising:
if one of the master device and the slave device fails to receive the first Bluetooth data, registering, by the receiver, a complementing identifier for first Bluetooth data successfully received by the receiver, and registering, by the receiver, a missing identifier for first Bluetooth data unsuccessfully received by the receiver, wherein the receiver, in the predetermined downstream slot, forwards the first Bluetooth data having the complementing identifier to the sender via the second Bluetooth link and requests the sender to send the first Bluetooth data having the missing identifier to the receiver; or
if only one of the master device and the slave device fails to receive the first Bluetooth data, registering, by the failed receiver that fails to receive the first Bluetooth data, a missing identifier for the first Bluetooth data, wherein the failed receiver, in the predetermined downstream slot, requests the successful receiver via the second Bluetooth link to forward the first Bluetooth data having the missing identifier to the failed receiver.

* * * * *